United States Patent
Asami et al.

[11] Patent Number: 5,875,213
[45] Date of Patent: Feb. 23, 1999

[54] GMSK COMMUNICATION DEVICE TEST SYSTEM

[75] Inventors: Koji Asami, Fukaya; Juichi Nakada, Kumagaya, both of Japan

[73] Assignee: Advantest Corp., Tokyo, Japan

[21] Appl. No.: 737,721

[22] PCT Filed: Mar. 26, 1996

[86] PCT No.: PCT/JP96/00786

§ 371 Date: Feb. 5, 1997

§ 102(e) Date: Feb. 5, 1997

[87] PCT Pub. No.: WO96/31039

PCT Pub. Date: Oct. 3, 1996

[30] Foreign Application Priority Data

Mar. 30, 1995 [JP] Japan ................................ 7-097907

[51] Int. Cl.[6] .................................................. H04L 27/14
[52] U.S. Cl. ................................ 375/336; 329/300
[58] Field of Search ............................. 375/274, 336, 375/226, 224; 329/300

[56] References Cited

U.S. PATENT DOCUMENTS 5,144,256   9/1992  Lim ........................................... 375/336
5,187,719   2/1993  Birgenheier et al. ..................... 375/226
5,283,811   2/1994  Chennakeshu et al. ................. 375/234

FOREIGN PATENT DOCUMENTS 7-50692  2/1995  Japan .
8-37544  2/1996  Japan .

Primary Examiner—Tesfaldet Bocure
Attorney, Agent, or Firm—Muramatsu & Associates

[57] ABSTRACT

A communication device test system is unnecessary to consider a phase offset between reproduced ideal data and phase data to be measured. The communication device test system includes AD converters for sampling two rectangular signals, an offset detector for determining offset and amplitude values which are a center of phase rotation, a phase detector for producing phase data from data subtracted by the offset, a differentiator for converting the phase data to a frequency data, a DFT which squares the frequency data and performs a DFT function to produce a bit rate frequency, a bit data regenerator which generates, when receiving the frequency data and bit rate frequency, bit data through a demodulation process, an ideal data generator for generating ideal frequency data, a difference calculation part for calculating the difference between the frequency data and the ideal data, and an integration/phase error detector which converts the error data to phase information and determines a root mean square phase error.

3 Claims, 3 Drawing Sheets

1 …

GMSK COMMUNICATION DEVICE TEST SYSTEM

TECHNICAL FIELD

This invention relates to a test system for testing communication devices modulated by a GMSK (Gaussian Minimum Shift Keying) method and used in a digital communication field such as a GSM (Global System for Mobile Communication).

BACKGROUND ART

Test items for testing a device under test (DUT) 100 which is a GMSK modulation communication device include measurement of phase differences between an DUT output and an ideal signal. The DUT output is an analog base band wave forms I(t) and Q(t), which represent an in phase signal and a quadrature phase signal, respectively.

The DUT 100 receives transmission data $TX_{dat}$ of, for example, 270.833 kbps transmission speed and provides the received data a digital conversion process of a Gaussian filter characteristics by a digital signal processing technology installed therein. The Gaussian converted data is DA (digital-analog) converted, and thus, an analog base band waveforms I(t) and Q(t) are produced by the DUT 100.

An example of conventional measurement system for testing the DUT is shown in FIG. 3. The base band waveforms I(t) and Q(t) are modulated by a rectangular modulator 110 whereby the base band waveforms are rectangularly modulated with the use of a carrier signal $f_c$ having a several MHz carrier frequency. The modulated high frequency signal $120_{rf}$ is measured by the measurement system as described below.

The measurement system is formed of an AD (analog-digital) converter 82, a buffer memory 83, an IQ demodulator 84, a phase/amplitude calculation part 86, and an error calculation part 90.

The AD converter 82, in receiving the high frequency signal $120_{rf}$ which has been rectangularly modulated, samples the signal $120_{rf}$ with a sampling clock $f_{smp}$ and converts the sampled data to a digital signal. The digitized signal for a certain period is stored in the buffer memory 83.

The IQ demodulator 84 extracts the base band I and Q signals which are received by the phase/amplitude calculation part 86. Amplitude data train $88_{amp}$ and phase data train $87_{phase}$ are obtained by the phase/amplitude calculation part 86 which are then provided to the error calculation part 90.

The error calculation part 90 is formed of a differential/IF removal part 92, a zero cross detection/compensation part 93, a clock phase/period detection part 94, a pro-synchronization bit pattern extraction part 95, an ideal data generator 96 and a difference detection/linear regression calculation part 97.

The differential/IF removal part 92, in receiving the phase data train $87_{phase}$ noted above, differentiates the phase data train to convert to frequency data train. The zero cross detection/compensation part 93 receives the frequency data train and establishes timing reproduction points through a zero crossing method. Based on the timing reproduction points, the clock phase/period detection part 94 reproduces a baud rate clock of 270 kbps transmission speed through a least square method.

In the pro-synchronization bit pattern extraction part 95, in receiving the data from the zero cross detection/compensation part 93 and the amplitude data train $88_{amp}$, produces a bit pattern train which is synchronized with the actual data by using the baud rate clock reproduced in the foregoing.

The ideal data generator 96, in receiving the bit pattern train from the pro-synchronization bit pattern extraction part 95, generates ideal data having ideal phase points. The ideal data generated by the ideal data generator 96 is to be used as reference data which is provided to the difference detection/linear regression calculation part 97.

The difference detection/linear regression calculation part 97, in receiving the ideal data noted above and the phase data train $87_{phase}$ from the phase/amplitude calculation part 86, calculates the difference between the actual data and the ideal data. Then the difference detection/linear regression calculation part 97 calculates an rms (root mean square) phase error and a frequency error through a regression process.

Because the conventional technology involves the above noted measurement and calculation means, in the difference detection/linear regression calculation part 97, when calculating the phase difference between the ideal data and the phase data train $87_{phase}$ from the phase/amplitude calculation part 86, phase offsets in both of the data must be taken into consideration. Further, there is a disadvantage in that it is necessary to adjust the zero crossing points in the zero cross detection/compensation part 93. Further disadvantage is that offsets of the base band waveforms I(t) and Q(t) are unknown.

It is an object of the present invention to provide a measurement/calculation means which is not required to consider the phase offset between the reproduced ideal data and the phase data train to be measured.

DISCLOSURE OF THE INVENTION

In the present invention, the measurement system includes AD converters 11 and 12 which receive two rectangular signals I(t) and Q(t) and respectively convert them to digital signals $I_a(t)$ and $Q_a(t)$; an offset detector 16 which determines, in receiving the I and Q data, offset values $I_{off}$ and $Q_{off}$ which represent a center of phase rotation of the modulation, an amplitude I and an amplitude Q; a phase detector 18 which calculates, in receiving the digital signals $I_a(t)$ and $Q_a(t)$ and subtracting the offset therefrom, phase data $P_{ase}(t)$ by calculating $\tan^{-1} Q/I$; a differentiator 20 for converting the phase data to a frequency data train f (t); a DFT (discrete Fourier transform) processor 22 which squares the frequency data f(t) and performs a DFT function at a bit rate of the modulation to produce a bit rate phase $p_0$ which is a timing signal for demodulation.

The measurement system further includes a bit data regenerator 24 which generates, when receiving the frequency data f(t) from the differentiator 20 and bit rate phase $p_0$ from the DFT processor 22, bit data $B_{dat}$ through a demodulation process; an ideal data generator 26 generates ideal frequency data $f_{ref}(t)$ based on the bit data $B_{dat}$; a difference calculation part 28 which calculates the difference between the frequency data f(t) from the differentiator 20 and the ideal data $f_{ref}$ and outputs the frequency error data; and an integration/phase error detection part 30 which integrates the error data to convert the data to phase information, and determines an rms (root mean square) value of the phase information, and outputs the rms value as an rms phase error.

By this arrangement, a test system for measuring the phase errors in the GMSK modulation device DUT is implemented.

In addition to the arrangement in the foregoing, buffer memories 13 and 14 may be provided to store the sampled data from the AD converters 11 and 12.

Further, in addition to the foregoing arrangement, an IQ demodulator may be provided prior to the AD converters 11 and 12 to receive the rectangularly modulated intermediate frequency signal and to demodulate and separate the intermediate signal to I and Q signals.

According to the present invention, the offset detector 16 determines offset values $I_{off}$ and $Q_{off}$ which define a center of phase rotation in the modulation by a method shown in the Japanese Patent Laying-open Publication No. 1994-191930.

The differentiator 20, in receiving the phase data $P_{ase}(t)$, converts the phase data to a frequency data f(t) by differentiating the present data and the previous data through a differential process. The DFT processor 22 squares the frequency data f(t) and performs a DFT function at a bit rate of the modulation to produce a bit rate phase $p_0$ which is a timing signal for demodulation.

The bit data regenerator 24 generates, when receiving the frequency data f(t) from the differentiator 20 and the bit rate phase $p_0$ from the DFT processor 22, bit data $B_{dat}$ through a demodulation process to produce ideal frequency data $f_{ref}(t)$.

The integration/phase error detection part 30 integrates the difference between the frequency data f(t) from the differentiator 20 and the ideal data $f_{ref}$ from the difference calculation part 28 to convert the data to phase information and determines an rms (root mean square) value of the phase information and outputs the rms value as an rms phase error. Therefore, it is not necessary to consider the phase offset in the phase data train of the signal to be measured.

BEST MODE FOR CARRYING OUT THE INVENTION

Figure 1:
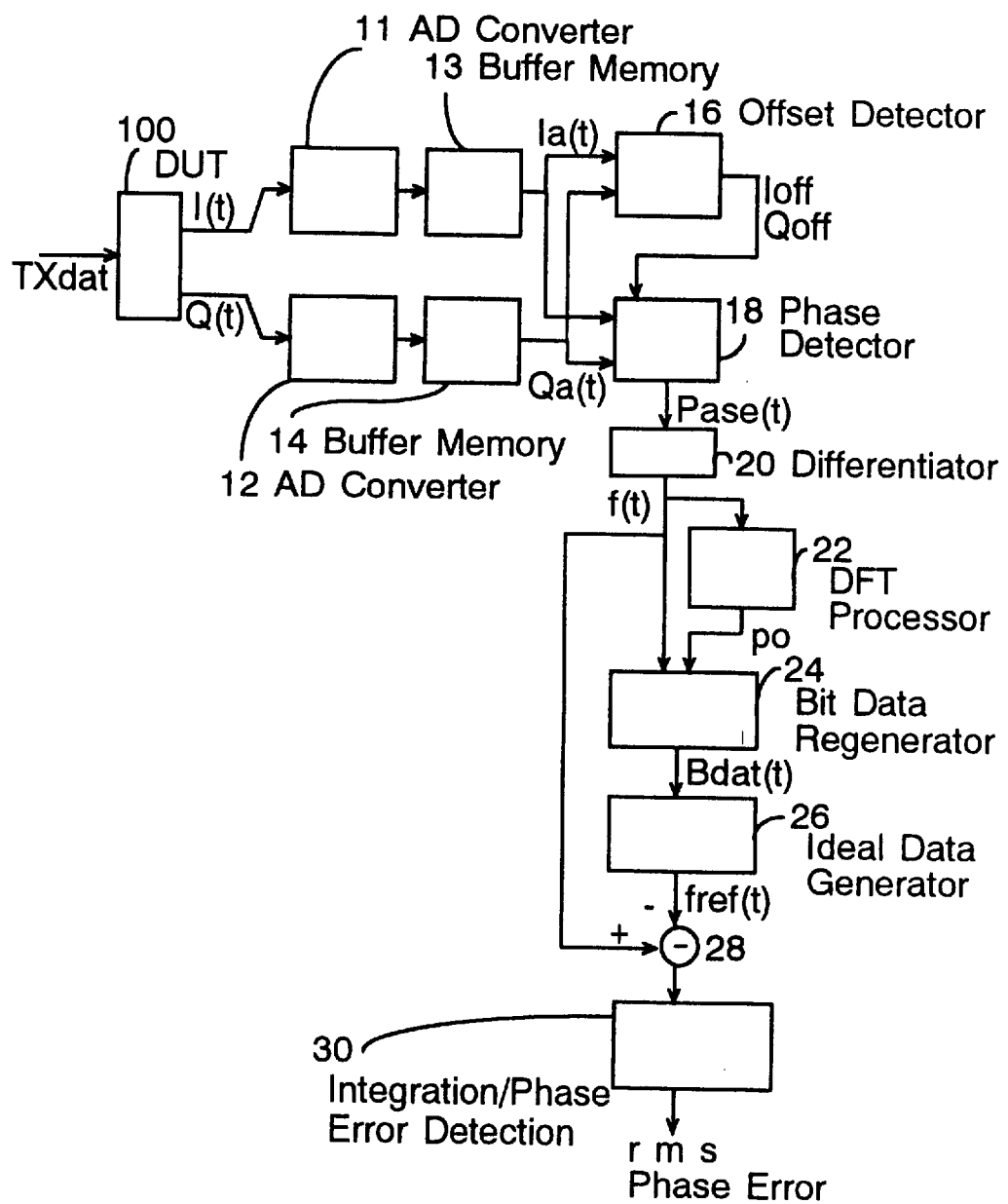
FIG. 1 shows an example of structure in a GMSK modulated communication device test system of the present invention.
Figure 2:
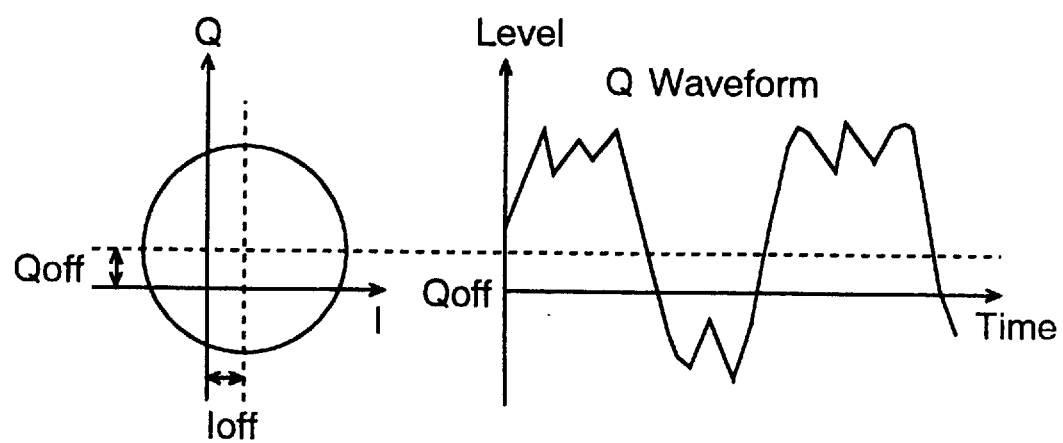
FIG. 2 is a diagram for explaining a center of phase rotation in a Q signal waveform and phase modulation.

In the present invention, the measurement system directly measures the base band waveforms I(t) and Q(t) of the DUT 100 as shown in FIG. 1. The measurement system is formed of AD (analog-digital) converters 11, 12, buffer memories 13, 14, an offset detector 16, a phase detector 18, a differentiator 20, a DFT (discrete Fourier transform) processor 22, a bit data regenerator 24, an ideal data generator 26, a difference calculation part 28 and an integration/phase error detection part 30.

The AD converter 11 samples the base band waveform I(t) by a sampling clock and converts the sampled data to a digital signal which is stored in the buffer memory 13. The AD converter 12 samples the base band waveform Q(t) by the sampling clock and converts the sampled data to a digital signal which is stored in the buffer memory 14. Here, it is shown that the wave forms I(t) and Q(t) are functions of time.

The offset detector 16 which has a means for detecting offset points as disclosed in the Japanese Patent Laying Open Publication No. 1994-191930. The offset detector 16, in receiving I component amplitude data $I_a(t)$ from the buffer memory 13, obtains a histogram distribution of the I component amplitude levels. The offset detector 16 detects two maximum peak points in the histogram and accurately determines an offset value $I_{off}$ which is a midpoint of the two maximum peaks and an amplitude I which is a difference between the two maximum peaks. Similarly, based on the Q component amplitude data $Q_a(t)$ from the buffer memory 14, the offset detector 16 studies a histogram distribution of the Q component amplitude levels and determines an offset value $Q_{off}$ which is a midpoint of two maximum peaks in the histogram and an amplitude Q which is a difference between the two maximum peaks.

The phase detector 18, detects an I component which is the I component amplitude subtracted by the offset noted above, i.e., $I_b(t)=I_a(t)-I_{off}$, and a Q component which is the Q component amplitude subtracted by the offset noted above, i.e., $Q_b(t)=QI_a(t)-Q_{off}$. Based on these relationship, the phase detector 18 calculates phase data $P_{ase}(t)=\tan^{-1}(Q_b(t)/I_b(t))$ which is provided to the differentiator 20.

In receiving the phase data $P_{ase}(t)$ from the phase detector 18, the differentiator 20 performs a differential function by obtaining a difference between the present phase data and the phase data of immediately before the present data to convert the phase data to a frequency data train f(t).

The DFT processor 22, in receiving the frequency data train f(t), squares the frequency data and performs a DFT (discrete Fourier transform) function at a bit rate of the modulation so that a bit rate frequency $f_0$, which is a timing signal for demodulation, is obtained.

The bit data regenerator 24, in receiving the frequency data f(t) from the differentiator 20 and bit rate phase $p_0$ from the DFT processor 22, generates bit data $B_{dat}$ through a demodulation process. Based on the bit data $B_{dat}$, the ideal data generator 26 generates ideal frequency data $f_{ref}(t)$.

The difference calculation part 28 calculates the difference between the frequency data f(t) from the differentiator 20 and the ideal data $f_{ref}$ noted above, and provides the results of this calculation to the integration/phase error detection part 30 as error data.

The integration/phase error detection part 30 integrates the error data to convert the data to phase information. The integration/phase error detection part 30 further determines an rms (root mean square) value of the phase information and outputs the rms value as an rms phase error.

In the foregoing explanation, the calculation processes after the buffer memories 13 and 14 can be performed by a high speed DSP (digital signal processor).

In the foregoing example, the buffer memories 13 ad 14 are provided which store the digital data from the AD converters 11 and 12 so that the data read out from the buffer memories is processed in the later stages of the measurement system. However, it is also possible to obviate the buffer memories 13 and 14 by employing a high speed DSP.

Figure 3:
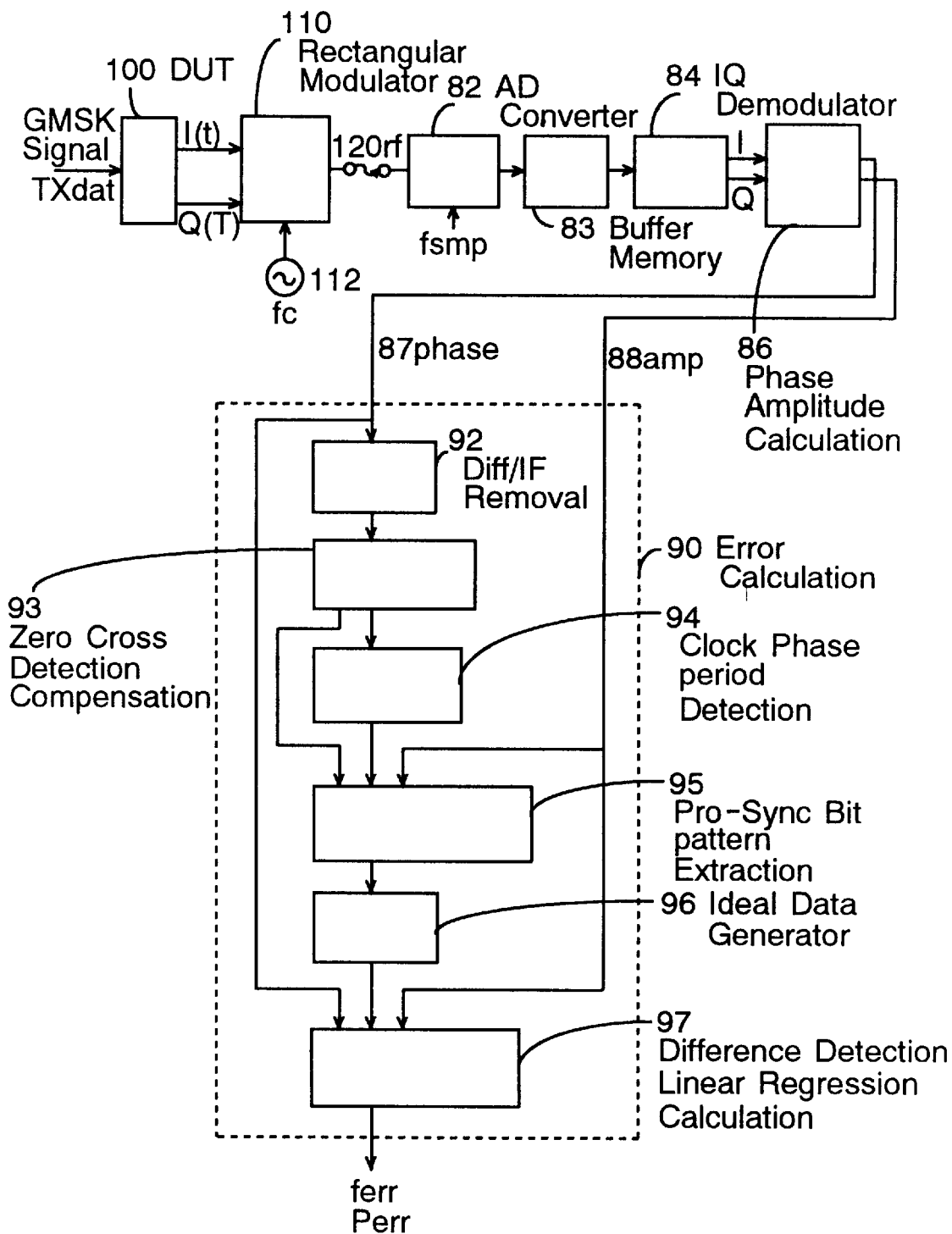
FIG. 3 shows an example of structure in a conventional GMSK modulated communication device test system.

Further, in the foregoing example, the base band waveforms I(t) and Q(t) are digitized by the AD converters 11 and 12, however, it is also possible to rectangularly modulate the base band waveforms and then to IQ demodulate the rectangularly modulated signal before being provided to the AD converters 11 and 12 as shown FIG. 3.

Furthermore, in the foregoing example, the DUT is a type of device which outputs the base band waveforms I(t) and Q(t). However, the DUT itself may include a rectangular modulator and output a rectangularly modulated signal. In such a situation, the measurement system may employ an IQ demodulator which demodulate the rectangularly modulated signal and separate the signal to I and Q waveforms.

Industrial Applicability

Since the present invention is configured as in the foregoing, it has the following effects:

The offset detector 16 determines offset values $I_{off}$ and $Q_{off}$ which represent a center of phase rotation in the modulation by a method shown in the Japanese Patent Laying-Open Publication No. 1994-191930.

The differentiator 20, in receiving the phase data $P_{ase}(t)$, converts the phase data to a frequency data f(t) by differentiating the present data and the previous data through a differential process.

The DFT processor 22 squares the frequency data f(t) and performs a DFT function at a bit rate of the modulation to produce a bit rate phase $p_0$ which is a timing signal for demodulation.

The bit data regenerator 24 generates, when receiving the frequency data f(t) from the differentiator 20 and the bit rate phase $p_0$ from the DFT processor 22, bit data $B_{dat}$ through a demodulation process to produce ideal frequency data $f_{ref}(t)$.

The integration/phase error detection part 30 integrates the difference between the frequency data f(t) from the differentiator 20 and the ideal data $f_{ref}$ from the difference calculation part 28 to convert the data to phase information and determines an rms (root mean square) value of the phase information and outputs the rms value as an rms phase error. Therefore, it is not necessary to consider the phase offset with phase data train of the signal to be measured.

What is claimed is:

1. A GMSK (Gaussian Minimum Shift Keying) communication device test system, comprising:

AD converters (11, 12) which receive two rectangular signals I(t) and Q(t) and respectively convert them to digital signals $I_a(t)$ and $Q_a(t)$;

an offset detector (16) which determines, in receiving the digital signals $I_a(t)$ and $Q_a(t)$, offset values $I_{off}$ and $Q_{off}$ which represent a center of phase rotation of the modulation, an amplitude I and an amplitude Q;

a phase detector (18) which calculates, in receiving the digital signals $I_a(t)$ and $Q_a(t)$ and subtracting the offset therefrom, phase data $P_{ase}(t)$ by calculating $\tan^{-1}Q/I$;

a differentiator (20) for converting the phase data to a frequency data train f(t);

a DFT (discrete Fourier transform) processor (22) which squares the frequency data f(t) and performs a DFT (discrete Fourier transfer) function at a bit rate of the modulation to produce a bit rate phase $p_0$ which is a timing signal for demodulation;

a bit data regenerator (24) which generates, when receiving the frequency data f(t) from the differentiator (20) and bit rate phase $p_0$ from the DFT processor (22), bit data $B_{dat}$ through a demodulation process;

an ideal data generator (26) generates ideal frequency data $f_{ref}(t)$ based on the bit data $B_{dat}$;

a difference calculation part (28) which calculates the difference between the frequency data f(t) from the differentiator (20) and the ideal data $f_{ref}$ and outputs the frequency error data; and an integration/phase error detection part (30) which integrates the error data to convert the data to phase information and determines an rms (root mean square) value of the phase information and outputs the rms value as an rms phase error.

2. A GMSK communication device test system as defined in claim 1, further comprising:

buffer memories (13, 14) for storing sampled data from the AD converters (11, 12).

3. A GMSK communication device test system as defined in claim 1, further comprising:

an IQ demodulator provided prior to the AD converters for receiving the rectangularly modulated intermediate frequency signal and demodulating and separating the intermediate signal to I and Q signals.

* * * * *